Nov. 13, 1934.　　　J. W. VANDERVEER　　　1,980,710

WHEEL

Filed Feb. 8, 1930

INVENTOR.
Jewell W. Vanderveer
BY
ATTORNEYS.

Patented Nov. 13, 1934

1,980,710

UNITED STATES PATENT OFFICE 1,980,710

WHEEL

Jewell W. Vanderveer, Syracuse, N. Y., assignor to Erie Malleable Iron Company, Erie, Pa., a corporation of Pennsylvania Application February 8, 1930, Serial No. 426,825

4 Claims. (Cl. 301—13)

In placing dual rims on wheels difficulty is experienced in maintaining such rims in alinement. This is particularly true where the rear rim rests on a beveled seat and is forced up on the beveled seat through clamps arranged around the periphery of the wheel. With such structures, the operators usually set the first clamps so as to force the rim farther on to the bevel than its final alinement warrants, thus locking the rim against being brought to proper alinement when subsequent clamps are set. This difficulty has been, in a measure provided for in a structure illustrated in my application, Serial Number 168,728, filed Feb. 16th, 1927, wherein I have provided a spacing ring operating against the rim for forcing the same against the beveled surface and have provided a shoulder on the wheel center preventing a rearward movement of the spacing ring and consequently preventing a material misalinement of the rim through undue clamping action on the initial clamp. Such rims and wheel centers as made commercially involve some tolerances and in order to take care of these tolerances some spacing is required between the spacing ring and the alining shoulder in the structure of my prior application. The present invention is designed to reduce this tolerance so as to make a more accurate alinement under all conditions. Features and details of the invention will appear more fully from the specification and claims.

A preferred embodiment of the invention is illustrated in the accompanying drawing as follows:—

Figure 1:
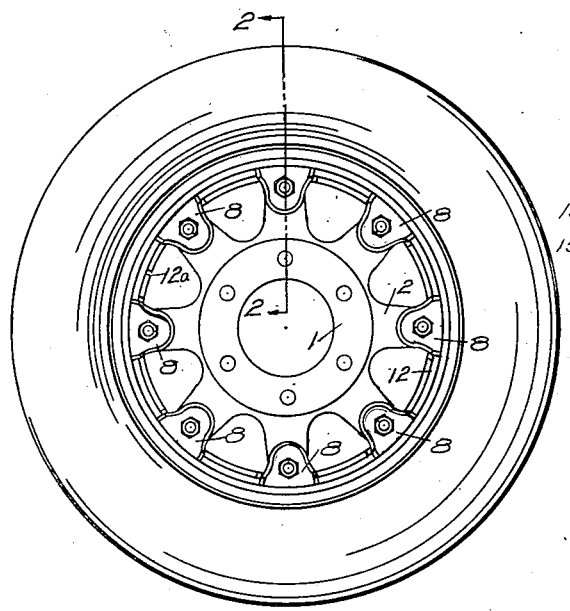

Fig. 1 shows a front elevation of the wheel.

Figure 2:
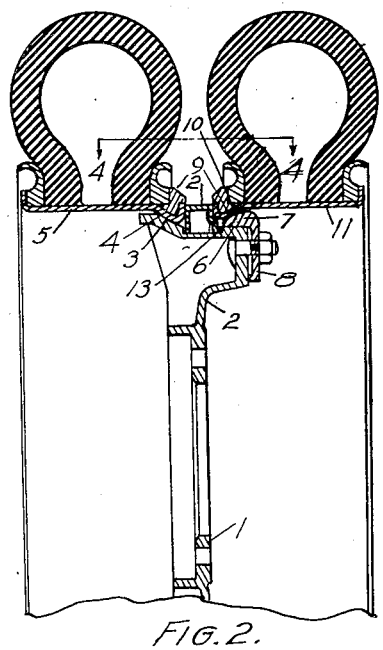

Fig. 2 a section on the line 2—2 in Fig. 1.

Figure 3:
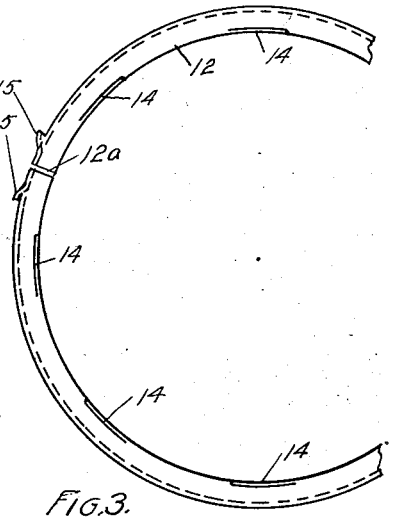

Fig. 3 a detached view of the spacing ring.

Figure 4:
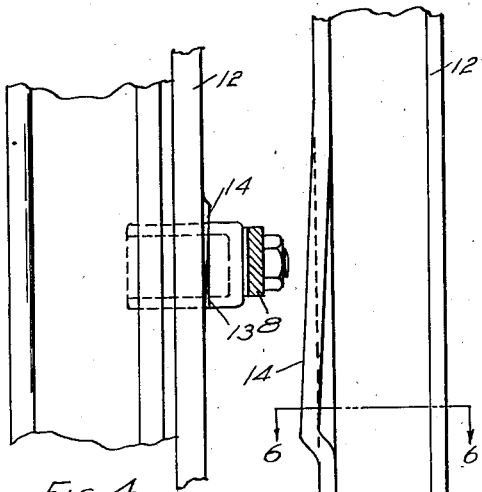

Fig. 4 a plan view of a part of the wheel rim, spacing ring and spoke end.

Figure 5:
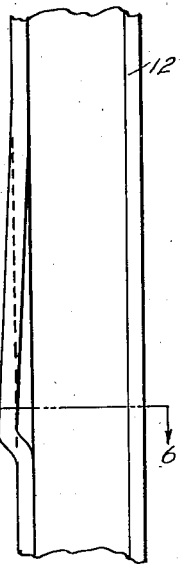

Fig. 5 a plan view from the inside of the spacing ring.

Figure 6:
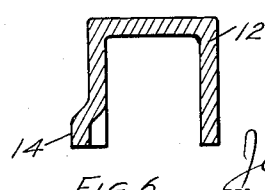

Fig. 6 a section on the line 6—6 of Fig. 5.

1 marks the hub of the wheel, and 2 spokes extending from the hub. The spokes are provided with beveled seats 3 at their radially outer ends, these seats being arranged at the axially inward portion of the spoke end and facing outwardly. A beveled surface 4 on a detachable rim 5 seats on the beveled seat 3.

A seating surface 6 is arranged on the axially outward portions of the spoke ends and wedge ends 7 carried by clamping plates 8 operate on the seats 6 and have beveled seats 9 operating against beveled surfaces 10 on the outboard rim 11.

A spacing ring 12 of channel form is arranged between the rims so that as the outboard rim is forced axially inward through the action of the clamping plates pressure is conveyed through the ring to the inboard rim forcing it on to its beveled seat. The ring is split at 12a and is placed inside of shoulders 13 arranged on the spoke ends. These shoulders operate in the manner of my prior application and limit the axially outward movement of the inboard rim very closely so that it is impossible to force any one part of the rim up the beveled surface 4 to such an extent as to create serious mis-alinement. But, as before stated, in order to take care of tolerances and consequently the initial position of the rim 5 on the beveled seat, some tolerance between the shoulder 13 and the ring 12 has been necessary.

In order to bring the ring into definite engagement with the shoulder under all conditions, I have provided the following means: The ring has a series of cam surfaces 14 arranged on its side, these cam surfaces being preferably formed by a stamping action striking out the wall of the ring. These beveled surfaces preferably correspond in number to the spokes. Driving shoulders 15 are struck up in the radially outer periphery of the ring.

In placing the rims in place the inboard rim is put on the wheel center, the split ring snapped into place with the beveled cams between the spokes. The ring is then moved circumferentially bringing the cam surfaces into engagement with the shoulders 13 and, if desired, this may be fully alined by driving on the lugs 15. In this way there is a positive backing for the inboard rim with an adjustment capable of taking up the necessary tolerances in the parts.

What I claim as new is:—

1. In a wheel, the combination of a wheel center having an axially inner beveled seat on its outer periphery; an inboard rim having a beveled surface engaging said seat; an outboard rim; clamps engaging the outboard rim and forcing it axially inwardly; a spacing ring between the rims, said spacing ring being of channel form; alining shoulders on the wheel center; and cam surfaces on the ring formed by deflecting a side wall of the ring, said surfaces engaging the alining shoulders and positively limiting the axial outward movement of the inboard rim.

2. In a wheel, the combination of a wheel center having spokes with axially beveled seats at the radial outward ends of the spokes; an inboard rim having beveled surfaces engaging said seats; an out-board rim on the spoke ends; clamping means engaging the out-board rim and forcing it axially inward; a spacing ring between the rims; alining shoulders on the spokes; and engaging surfaces on the ring engaging the shoulders positively limiting the axial outward movement of the in-board rim, said ring being circumferentially movable to engage and disengage the ring surfaces and the shoulders.

3. In a wheel, the combination of a wheel center having spokes with axially beveled seats at the radial outward ends of the spokes; an in-board rim having beveled surfaces engaging said seats; an out-board rim on the spoke ends; clamping means engaging the out-board rim and forcing it axially inward; a spacing ring between the rims; alining shoulders on the spokes; and engaging surfaces on the ring engaging the shoulders positively limiting the axial outward movement of the in-board rim, said surfaces and shoulders including camming portions adjusting the ring to the in-board rim and positively limiting the outward movement of the in-board rim.

4. In a wheel, the combination of a wheel center having spokes with axially beveled seats at the radial outward ends of the spokes; an in-board rim having beveled surfaces engaging said seats; an out-board rim on the spoke ends; clamping means engaging the out-board rim and forcing it axially inward; a spacing ring between the rims; alining shoulders on the spokes; and engaging surfaces on the ring engaging the shoulders positively limiting the axial outward movement of the in-board rim, said surfaces and shoulders including camming portions adjusting the ring to the in-board rim and positively limiting the outward movement of the in-board rim and movable into and out of engagement by a circumferential movement of the ring.

JEWELL W. VANDERVEER.